May 19, 1959  F. E. ALTMAN ET AL  2,887,009
PHOTOGRAPHIC OBJECTIVE COMPRISING SIX SEPARATED LENS ELEMENTS
Filed March 4, 1957

| EQUIVALENT FOCUS 100mm. | | | | f 2.87 |
|---|---|---|---|---|
| LENS | N | V | RADII | THICKNESSES |
| 1 | 1.7340 | 51.1 | $R_1 = +59.33$ mm. | $t_1 = 5.69$ mm. |
|   |        |      | $R_2 = +802.2$    | $S_1 = 0.60$ |
| 2 | 1.7340 | 51.1 | $R_3 = +59.33$    | $t_2 = 5.69$ |
|   |        |      | $R_4 = +802.2$    | $S_2 = 3.46$ |
| 3 | 1.6490 | 33.8 | $R_5 = -206.4$    | $t_3 = 3.07$ |
|   |        |      | $R_6 = +37.46$    | $S_3 = 7.69$ |
| 4 | 1.6490 | 33.8 | $R_7 = -37.46$    | $t_4 = 3.07$ |
|   |        |      | $R_8 = +206.4$    | $S_4 = 3.46$ |
| 5 | 1.7340 | 51.1 | $R_9 = -412.5$    | $t_5 = 5.69$ |
|   |        |      | $R_{10} = -55.68$ | $S_5 = 0.60$ |
| 6 | 1.7340 | 51.1 | $R_{11} = -412.5$ | $t_6 = 5.69$ |
|   |        |      | $R_{12} = -55.68$ | B.F.= 44.69 |

Fred E. Altman
Charles J. Melech
INVENTORS

BY Daniel L. Mayne,
Harold F. Bennett
ATTORNEY & AGENT

United States Patent Office 2,887,009
Patented May 19, 1959

2,887,009
PHOTOGRAPHIC OBJECTIVE COMPRISING SIX SEPARATED LENS ELEMENTS

Fred E. Altman and Charles J. Melech, Rochester, N.Y., assignors to Eastman Kodak Company, Rochester, N.Y., a corporation of New Jersey Application March 4, 1957, Serial No. 643,839

4 Claims. (Cl. 88—57)

This invention relates to photographic objectives and particularly to objectives suitable for copying color photographs on lenticular film. The object of the invention is to provide a highly corrected objective usable at apertures of about $f/3$ and greater and to cover an angular field of $\pm 11°$ with no appreciable vignetting and which is also comparatively inexpensive to manufacture.

In the history of the development of improved photographic objectives, the trend has generally been toward the use of higher refractive indices and a greater number of lens components. In particular, since the development of nonreflecting surfaces, the importance of cementing elements together to reduce surface reflections has greatly decreased. Accordingly, it has become practicable to divide a component into two components to improve the performance rather than to substitute a cemented doublet or triplet for a singlet component. There seems to be a basic superiority in this direction of development which is believed to stem from the fact that the weaker optical surfaces introduce less zonal aberration and that the overall effect is superior to the scheme of balancing the zonal aberrations of a glass air-surface with opposite zonal aberrations of an even more strongly curved cemented surface, as has usually been done heretofore, since it is usually impossible to get a perfect balance in the latter case. While the expense of manufacture is increased when a lens component is divided into two, it does not double the expense because the surfaces usually are weaker and more lens elements can be mounted on a single block for grinding and polishing. In particular we have found that an especially favorable arrangement economically is to divide a lens component into two identical components so that the factory does not have to tool up for two separate lens elements but can make both from the same set of tools and handle both as a single item in the stockroom. If preferred, one element can be made of slightly less diameter than the other and in that way elements made up for the larger diameter which would otherwise be rejected for chips or other blemishes at the edge can be edge-ground to the smaller diameter and used as the smaller element. The decision as to whether to simplify the stockroom procedure or to save on the number of rejected elements is affected by another factor, namely, the design of the mount of the objective. In designing the mount, it is sometimes more economical to have both elements of the same diameter and mounted in a single bore and with a spacing ring between them rather than to cut two separate shoulders to mount them on. At any rate, there are obvious advantages in having two elements which are identical with respect to the radii of curvature and the thickness and the type of glass of which the element is made, and it is optional whether to make them the same diameter or slightly different.

According to the invention, a six-element photographic objective is made up comprising two biconcave lens elements enclosing a diaphragm space and with their more strongly curved surfaces turned thereto, two identical positive meniscus lens elements axially aligned and spaced in front thereof and two identical positive meniscus lens elements axially aligned with and spaced therebehind, each positive element being turned with its convex side outward, and the over-all length of the objective being between 0.30 F and 0.60 F where F is the focal length of the objective as a whole. Preferably the refractive index of the positive elements is between 1.65 and 1.85 and that of the negative element between 1.58 and 1.78.

By identical is meant having the same radii of curvature and thickness but not necessarily exactly the same diameter.

We have found this type of objective to be less expensive to make and to be superior in optical performance to objectives having the same number of elements but made up as two cemented doublets and two single elements as for example in my earlier Patent No. 2,405,729.

According to a highly preferred form of the invention, an objective as above described is made up in which the respective radii of curvature R of the lens surfaces and the refractive indices N of the respective lens elements, each numbered by subscripts from front to rear, are within the limits set forth in the table below.

$$0.5\ F < +R_1 = +R_3 < 0.7\ F$$
$$2\ F < +R_2 = +R_4 < \infty$$
$$1.2\ F < -R_5 = +R_8 < 5\ F$$
$$0.3\ F < +R_6 = -R_7 < 0.45\ F$$
$$1.8\ F < -R_9 = -R_{11} < 10\ F$$
$$0.45\ F < -R_{10} = -R_{12} < 0.65\ F$$
$$1.68 < N_1 = N_2 < 1.78$$
$$1.60 < N_3 = N_4 < 1.70$$
$$1.68 < N_5 = N_6 < 1.78$$

As customary, the front of the objective is that end turned toward the longer conjugate distance, and the + and − signs associated with the respective radii R indicate surfaces respectively convex and concave to the front.

Figures 1, 2:
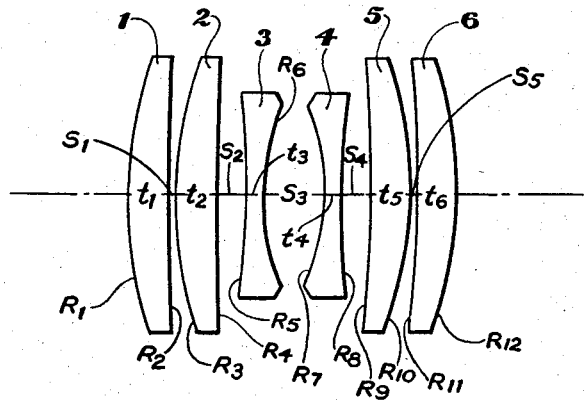
Fig. 1 shows in diagrammatic axial section an objective according to the invention.
Fig. 2 is a table of constructional specifications for a specific embodiment thereof.

Fig. 1 shows in axial section an objective according to the invention comprising two biconcave lens elements 3 and 4 enclosing a diaphragm space $S_3$ in which a diaphragm or aperture stop is optionally provided and two positive meniscus elements 1, 2 spaced in front thereof and optically aligned on the axis 10 and two further positive meniscus elements 5, 6 axially aligned behind the biconcave elements. Lens elements 1 and 2 are identical, as above defined, as are also elements 3 and 4 and elements 5 and 6 in accordance with the invention.

Fig. 2 gives a table of constructional data for a specific embodiment of the invention. This table is repeated below for convenience.

[EF = 100 mm.   f/2.87.]

| Lens | N | V | Radii, mm. | Thicknesses, mm. |
|---|---|---|---|---|
| 1 | 1.7340 | 51.1 | $R_1 = +59.33$ | $t_1 = 5.69$ |
|   |        |      | $R_2 = +802.2$ | $s_1 = 0.60$ |
| 2 | 1.7340 | 51.1 | $R_3 = +59.33$ | $t_2 = 5.69$ |
|   |        |      | $R_4 = +802.2$ | $s_2 = 3.46$ |
| 3 | 1.6490 | 33.8 | $R_5 = -206.4$ | $t_3 = 3.07$ |
|   |        |      | $R_6 = +37.46$ | $s_3 = 7.69$ |
| 4 | 1.6490 | 33.8 | $R_7 = -37.46$ | $t_4 = 3.07$ |
|   |        |      | $R_8 = +206.4$ | $s_4 = 3.46$ |
| 5 | 1.7340 | 51.1 | $R_9 = -412.5$ | $t_5 = 5.69$ |
|   |        |      | $R_{10} = -55.68$ | $s_5 = 0.60$ |
| 6 | 1.7340 | 51.1 | $R_{11} = -412.5$ | $t_6 = 5.69$ |
|   |        |      | $R_{12} = -55.68$ | BF = 44.69 |

In this table as in the drawing, the lens elements are numbered in order from front to rear in the first column, the refractive indices N for the D line of the spectrum and the conventional dispersive indices of V are given in the second and third columns, and the radii of curvature R of the lens surfaces, the thicknesses t of the lens elements and the spaces S between the lens elements, each numbered by subscripts in order from front to rear, are given in the last two columns. The + and − signs associated with the respective radii denote surfaces respectively convex and concave to the front. The over-all length of the objective is 44.8 mm. The above figures are given for a focal length of 100 mm. to be ratioed up or down for any desired focal length.

It will be directly evident from the above table of data that the example shown embodies all the features of the invention as above set forth. This objective was designed for use at f/2.87 and at a magnification of 3.89 in a photographic printer special features of which are described in greater detail in copending application Serial No. 648,868, filed concurrently herewith by our colleagues J. H. McLeod, and R. Kingslake, now Patent No. 2,843,011, and is very useful in photographic enlargers and printers in general and for other purposes at magnifications of about 2 to about 6 particularly in color photography in which a minimum of vignetting at the corners of a picture is required.

We claim:

1. A photographic objective comprising six airspaced and axially aligned lens components each component consisting of a single unitary lens element, said six components consisting of two biconcave components enclosing a diaphragm space and with their more strongly curved surfaces turned thereto, two positive meniscus components in front thereof and two positive meniscus components therebehind, each positive component being turned with its convex side outward, the over-all length of the objective being between 0.30 F and 0.60 F where F is the focal length of the objective as a whole, the radii of curvature of the surfaces bounding the diaphragm space being between 0.3 F and 0.45 F, the two front meniscus components being identical to each other within manufacturing tolerances with respect to the refractive index, the radii of curvature and the thickness thereof, and the two rear meniscus components likewise being identical to each other.

2. An objective according to claim 1 in which the refractive indices of the positive elements are between 1.65 and 1.85 and those of the negative elements are between 1.58 and 1.78.

3. An objective according to claim 1 in which moreover the radii of curvature R of the lens surfaces and the refractive indices N of the lens elements, each numbered by subscripts from front to rear, are within the following limits:

$0.5\ F < +R_1 = +R_3 < 0.7\ F$
$2\ F < +R_2 = +R_4 < \infty$
$1.2\ F < -R_5 = +R_8 < 5\ F$
$0.3\ F < +R_6 = -R_7 < 0.45\ F$
$1.8\ F < -R_9 = -R_{11} < 10\ F$
$0.45\ F < -R_{10} = -R_{12} < 0.65\ F$
$1.68 < N_1 = N_2 < 1.78$
$1.60 < N_3 = N_4 < 1.70$
$1.68 < N_5 = N_6 < 1.78$ wherein the + and − signs associated with the radii R denote surfaces respectively convex and concave to the front and wherein F is the focal length of the objective as a whole.

4. A photographic objective comprising six airspaced and axially aligned lens components, each component consisting of a single unitary lens element, in which the radii of curvature R of the optical surfaces and the refractive indices N of the lens elements, each numbered by subscripts from front to rear, are within the following limits:

$0.5\ F < +R_1 < 0.7\ F$
$2\ F < +R_2 < \infty$
$0.5\ F < +R_3 < 0.7\ F$
$2\ F < +R_4 < \infty$
$1.2\ F < -R_5 < 5\ F$
$0.3\ F < +R_6 < 0.45\ F$
$0.3\ F < -R_7 < 0.45\ F$
$1.2\ F < +R_8 < 5\ F$
$1.8\ F < -R_9 < 10\ F$
$0.45\ F < -R_{10} < 0.65\ F$
$1.8\ F < -R_{11} < 10\ F$
$0.45\ F < -R_{12} < 0.65\ F$
$1.68 < N_1 < 1.78$
$1.68 < N_2 < 1.78$
$1.60 < N_3 < 1.70$
$1.60 < N_4 < 1.70$
$1.68 < N_5 < 1.78$
$1.68 < N_6 < 1.78$ wherein the + and − signs associated with the radii R denote surfaces respectively convex and concave to the front and wherein F is the focal length of the objective as a whole, the over-all length of the objective being between 0.30 F and 0.60 F.

References Cited in the file of this patent

UNITED STATES PATENTS

| | | |
|---|---|---|
| 1,825,828 | Sonnefeld | Oct. 6, 1931 |
| 2,389,016 | Wynne | Nov. 13, 1945 |
| 2,401,324 | Altman | June 4, 1946 |
| 2,601,592 | Cook | June 24, 1952 |
| 2,735,340 | Aklin | Feb. 21, 1956 |
| 2,774,280 | Cook | Dec. 18, 1956 |

FOREIGN PATENTS

| | | |
|---|---|---|
| 168,923 | Great Britain | Sept. 12, 1921 |